Aug. 15, 1967   J. WÜNNING   3,335,546
METHOD FOR PURIFYING PROTECTIVE GASES
Filed Dec. 30, 1963   3 Sheets-Sheet 3
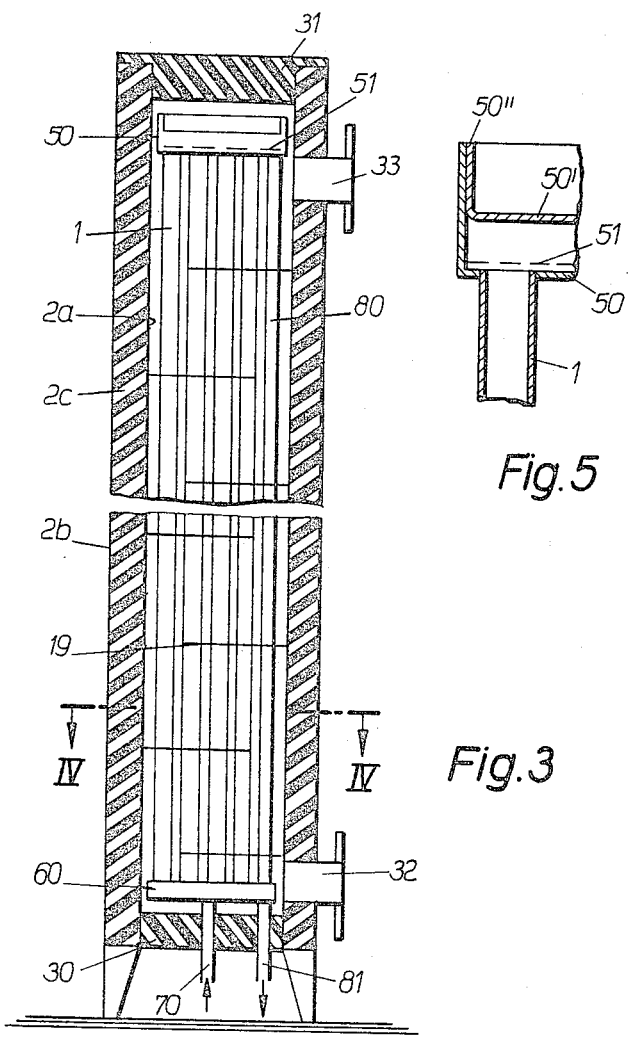
Fig.5
Fig.3
Fig.4
Inventor
JOACHIM WÜNNING
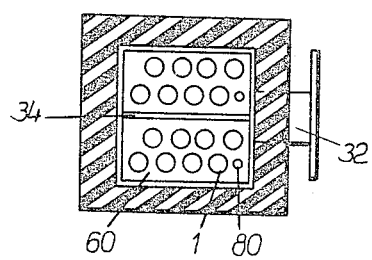

United States Patent Office 3,335,546
Patented Aug. 15, 1967

3,335,546
METHOD FOR PURIFYING PROTECTIVE GASES
Joachim Wünning, Leonberg, Wurttemberg, Germany, assignor to Aichelin Industrieofenbau, Stuttgart, Germany, a company of Germany
Filed Dec. 30, 1963, Ser. No. 334,494
Claims priority, application Germany, Dec. 28, 1962, A 41,991; Nov. 7, 1963, A 44,500
2 Claims. (Cl. 55—33)

The present invention relates to a method for removing undesirable components, especially water and carbon dioxide, from gases and especially from protective gases.

In the metal working industry protective gas atmospheres are being employed at an ever increasing rate in the heat treatments of metals. Before the protective gases can be used for this purpose, they must be cleaned of undesired components which might impair the quality of the metal parts to be treated. These components are primarily water, but also carbon dioxide, hydrogen sulphide, and sulphur dioxide. Although it is possible to eliminate these components by passing the protective gas successively through a series of treating stages, this generally requires very large and expensive apparatus and can therefore be carried out economically only if a large output of purified protective gas is required. For a small and medium output, these large apparatus are too uneconomical to be of practical value which is partly due also to the fact that they require well-trained and experienced personnel for servicing and repairing the apparatus.

In order to simplify the treatment of the protective gas and to eliminate the undesirable components therefrom in one method step, apparatus have been developed which operate with an adsorbent which has a great affinity not only for water vapor but also for carbon dioxide and sulphur compounds. Such an adsorbent which is very effective consists of zeolites, as described, for example, in "Molecular Sieves" by Charles K. Hersh, New York, a book published by the Reinhold Publishing Corporation, Chapman & Hall, Ltd., in London.

The separation of the undesired components from the protective gas is carried out by this method in such a manner that during an adsorption period the protective gas is first passed through the adsorbents and during a subsequent desorption or regenerating period the adsorbents are regenerated by expelling the accumulated materials therefrom. In order to be economical the regenerating cycle of this method should be as short as possible. During the adsorption period, the charged adsorbent is heated in a conventional manner by a current of a purge gas which usually consists of hot air and is passed through the adsorbent. The adsorbent is thereby preheated to the regenerating temperature and in addition it is used as a purge gas. When the accumulated substances are expelled, the hot air current is replaced by a current of cold air which cools the adsorbent to the operating temperature which is most suitable for effecting the adsorption. During this cooling period it is necessary again to flush the cold air gradually out of the adsorbent by a supply of protective gas so that at the beginning of the next adsorption period no air components and thus no oxygen components will remain in the adsorbent.

This known method is generally carried out by means of three adsorption chambers or adsorption beds which are filled with adsorbents and the first of which adsorbs the undesired components, while the second is being heated for the regeneration of the adsorbents and the third is cooled to the operating temperature. In order to carry out the regenerating cycle within the shortest possible period of time, it is necessary to conduct large quantities of hot air or cold air through the adsorption chambers or beds. This, however, means that the required valves for controlling the flow of hot air and cold air, and of the protective gas for flushing out the cold air have to be of relatively large dimensions. Furthermore, these valves must be designed so as to seal absolutely tight even though they are subjected to very quick and strong changes in temperature. If their sealing action is no longer reliable, the danger occurs that during the adsorption period air will penetrate into the current of protective gas with the result that the quality of the material to be treated will be seriously impaired by the oxygen content of this air. The operation of these known apparatus which during the regenerating period operate by so-called "direct" heating therefore involves serious valve difficulties, the so-called "valve problem," inasmuch as there are no valves available which can be absolutely relied upon to prevent even the admission of the slightest traces of oxygen into the apparatus. A further disadvantage of these known apparatus is due to the fact that the velocity of flow of the heating gas current which is conducted through the adsorbent cannot exceed a certain limit since above a certain velocity the particles of the adsorbent will start to move relative to each other and to rub on each other. The wear and gradual consumption of the adsorbent which is caused hereby limits the quantity of hot or cold air which can be passed therethrough within a certain period of time and thus also limits the minimum period between successive cycles. Finally, the continuous change between an oxidizing and a reducing atmosphere causes the formation of deposits on the adsorbents which impair their adsorptive power.

In those cases in which it is merely of importance to remove the water content from the protective gas, that is, to dry the latter, the regeneration of the adsorbent may be carried out by a circulation of protective gas for which purpose two adsorption chambers or beds may be sufficient. This simplified regenerating method cannot, however, be employed in the present case in which in the same step not only the water component, but also further detrimental components are to be removed by the adsorbent from the protective gas. The apparatus which are known for the purpose operate by means of a so-called "co-adsorption." They absolutely require a purge gas current which during the regeneration has to be passed through the adsorption bed and is thereafter discharged to the outside. In the purification of protective gas it is generally necessary to remove carbon dioxide gases amounting to 10 to 15% by volume of the protective gas. The adsorption of these amounts of carbon dioxide generates a considerable adsorption heat whereby in a normal operation the adsorbent is heated up to a temperature of 60 to 90° C. This, in turn, means that the adsorptive capacity of the adsorbent then decreases very considerably as compared with an operating temperature of 20° C., namely, by about 50%. During the adsorption period these apparatus operate strictly adiabatically.

In order to overcome the disadvantages of the above-mentioned apparatus which operate by direct purging and adsorb under adiabatic conditions, cooling coils or a combination of cooling and heating coils have been installed in the adsorption bed. This permits the adsorption process to be carried out under isothermal conditions, which means that the operating temperature may be held constant. On the other hand, however, this also requires such a considerable increase in the amount and cost of the necessary equipment that for this and other reasons these apparatus have so far not been used in actual practice. The possibility which is attained by such an indirect heating to separate the circulation of protective gas from the circulation of the heating or cooling air overcomes the so-called "valve problem" as previously referred to.

The adsorbent may be heated during the regeneration or desorption period by means of hot air flowing through heating coils at a velocity which obviously can no longer have any influence upon the wear and attrition of the adsorbent. The adsorbent is also no longer subjected to the changes between oxidation and reduction so that its adsorptive capacity will also not be impaired by undesirable deposits.

Despite the mentioned advantages of the apparatus in which the adsorbent is heated and cooled indirectly, they have not been used in actual practice because, aside from the difficulty of quickly supplying and conducting away large amounts of heat through the heating or cooling coils, there are other, very serious problems which occur when heating indirectly during the regeneration of the adsorbent. These problems are due to the fact that the highest permissible temperature to which the adsorbent may be heated during the period of regeneration is not sufficient for again expelling all of the water which has been adsorbed. In the "direct" heating method, on the other hand, in which the adsorbent is heated during the regeneration period by passing a current of hot air therethrough, the hot air also serves as a purge gas which causes the partial pressure of the water vapor to be lowered. When heating the adsorption bed indirectly it is therefore necessary during the regeneration period to conduct a purge gas through the adsorbent. Although the use of raw unpurified protective gas which when properly cooled only contains a small component of water vapor would ordinarily appear to be desirable it has been found in actual practice that it causes such considerable difficulties that it is quite proper to speak of a "purge problem." In one known method, the purge gas is passed through the adsorbent in the same direction in which the protective gas to be purified flows through the adsorbent in order to insure that, when the gas is discharged from the apparatus, the water vapor will be completely expelled. When expelling the water vapor in this manner, the danger occurs that, when switching the operation from the adsorption to the desorption period or vice versa, small quantities of the undesired components which are contained in the purge gas will be caught and retained in the adsorbent bed near the outlet end thereof.

The same danger occurs when the raw gas is employed as a purge gas and when it is passed from the outlet side of the protective gas through the adsorption bed which is to be regenerated. This is due to the fact—a fact well-known in the vacuum art—that traces especially of water vapor may remain on the container walls for a very long time which can be removed only by very intensive purging. For these reasons it has so far been impossible to produce protective gases of the highest degree of purity even though they are in greatest demand.

It is an object of the present invention to provide a method by means of which it is possible to realize the advantages and avoid the above-mentioned disadvantages of heating the charged adsorbent indirectly during the regeneration period. Accordingly, it is a further object of the invention to solve the so-called purge problem which occurs when such an indirect heating method is employed, and to find a manner of producing protective gases of the highest degree of purity by means of a simple, relatively inexpensive and reliable apparatus which is designed so as to permit it also to be economically built and employed for a smaller or medium output.

According to the invention, these objects are attained by carrying out the desorption or regeneration of the adsorbent progressively by first expelling the substances of a lower affinity as a purging agent. It is then advisable to heat the area of the adsorbent which is charged with the substances of greater affinity to a temperature which is most suitable for such expelling before similarly heating the areas which are charged with the substances of a lower affinity. This procedure permits in a very simple manner first to start the process of expelling the substances of greatest affinity and then to aid in the removal of these substances by the subsequent purging action of the substances of a lower affinity.

The present invention is based upon the concept that during the adsorption period the adsorption of the different substances occurs in a certain order of succession and that the adsorbent will at first eagerly take up the substances for which it has the greatest affinity and that the layers of the adsorbent in the area next to the point of entry of the gas can thus no longer be charged with other substances of a lower affinity. A kind of stratification will therefore occur in the adsorption bed in the direction of flow of the gas to be purified insofar as at first the substances of the greatest affinity to the adsorbent and thereafter the substances of a progressively lower affinity will be adsorbed. If the undesired components of the protective gas consist, for example, of water vapor and carbon dioxide, the layer of adsorbent adjacent to the point of entry of the protective gas will be saturated with water vapor, while the next following layer will contain carbon dioxide. If the adsorbent is heated according to the conventional method, the substances of a lower affinity, for example, the carbon dioxide, would first be expelled, while the expelling of the substance of the highest affinity, for example, the water vapor, would not be started until the temperature has increased sufficiently and not until the substances of a lower affinity have long been expelled. The result of this procedure is that extremely large quantities of purge gas are required which make it prohibitive to employ purified protective gas for this purpose and make it necessary to resort to other gases, for example, raw protective gas, which then result in the purging difficulties as previously discussed.

By applying the inventive concept of controlling the regeneration process so that always the substances of a lower affinity are used as purging agents, it is possible to effect a proper regeneration. Although the mentioned control of the regeneration may be effected by different procedures the most suitable method has been found to be that of successively heating the layers or areas of the adsorbent which contain the substances of different affinity. Since protective gases contain, for example, considerable components of carbon dioxide, the purging effect which is attained by the expelled carbon dioxide during the expelling, for example, of the water vapor is very considerable.

This purging effect may be employed either in the form of a vacuum desorption in which a supply of additional purge gas may be entirely omitted or the purging process may be accelerated by employing an additional purge gas current. This purge gas current is preferably passed through the adsorbent in a direction leading from the areas of the adsorbent which are charged with substances of a lower affinity to the areas with substances of a higher affinity so that the expelled substances of a power affinity will considerably assist in the regeneration process.

Numerous tests carried out in the actual practice of the new method have proved the effectiveness of this method and have shown that, inasmuch as the amounts of additional purge gas which are required are relatively small, it is economically very well possible to employ for this purpose a protective gas which has already been purified. When using a protective gas with a content of carbon dioxide of about 10% and a content of water vapor of about 2 to 3%, an amount of less than 10% of the amount produced of pure gas is required for the use as additional purge gas.

The new method may be carried out by means of a very simple and reliable apparatus which has the particular advantage that no purge gas which is charged with water vapor and no unpurified gas can ever pass to the outlet side of the adsorption chambers or beds. Therefore, the pipe lines and container parts at the outlet side of the gas are only touched by a flow of purified protective gas in one or the other direction.

The apparatus for carrying out the method according to the invention preferably comprises three indirectly heated adsorption chambers. One after another of these chambers receives periodically a flow of protective gas to carry out the adsorption process, while another chamber receives a flow of purge gas to regenerate the adsorbent after completing its adsorption of process. During the same time the third chamber is cooled to the temperature which is most suitable for the next adsorption. One particular inventive feature of the apparatus is that fact that the adsorption chambers, each of which comprises a series of containers in the form of pipes with thin walls are preferably designed in the form of heat exchangers and contain the adsorbents are adapted to be heated to different temperatures in different areas, and that the purge gas current flows through these pipes in the direction opposite to the flow of the protective gas to be purified. The adsorption chambers are preferably heated in such a manner that the adsorption pipes are surrounded by a heat-insulated jacket or housing into which adjacent to the inlet for the protective gas a heating medium may be supplied which after passing through the respective chamber along the outside of the adsorption pipes is discharged therefrom adjacent to the outlet of the purified protective gas. The heating medium therefore at first heats up the area of the adsorbent near the gas inlet and thereafter it slowly proceeds also to heat the subsequent areas of the adsorbent, as seen in the direction of flow of the protective gas, which are located, for example, at a higher elevation and are charged, for example, with carbon dioxide. When the regeneration is completed, the inside of the jacket may be supplied with a cooling medium which insures that, since the adsorbent is contained in the thin-walled adsorption pipes, it will be quickly cooled to the operating temperature for the next adsorption period so that the entire cycle of operations will be of a very short duration. Each of the three adsorption chambers may be further connected through a metering or throttle return valve to a common discharge line for the purified protective gas. This valve permits a return flow of a certain amount of purified protective gas through the respective chamber in which the adsorbent is to be regenerated to serve as a purge gas which, after passing through this chamber, is discharged to the outside. The entire apparatus may be of a very simple construction in which the individual chambers act like filters which are connected in parallel and are alternately operated so that the entire method of adsorbing, regenerating and cooling may be carried out continuously as long as desired. As already pointed out, there is absolutely no possibility that the pipe or container parts at the outlet side of the gas might be polluted by traces of water, carbon dioxide, or the like.

The particular construction of the adsorption chambers according to the invention also has considerable advantages insofar as their manufacture is concerned since, depending upon the required output of the apparatus, several equal units may be inserted in parallel connection into the chamber jackets. Furthermore, it is possible to make the units of a different height in order to adapt them to the particular operating requirements and operating conditions.

By employing the thin-walled adsorption pipes for holding the adsorbent and by making the pipes and the thickness of their walls of suitable dimensions, the advantage is attained that very short adsorption and regeneration periods may be attained. The most suitable layer thickness of the adsorbent as seen in the direction transverse to the flow of the gas has been found to be less than 60 mm. This layer thickness is attained by making the inner width of the adsorption pipes of a corresponding size.

The inventive design of adsorption chambers in the form of heat exchangers may also be applied to gas purifiers of other types than those which are designed especially for the generation of protective gas, and such adsorption chambers may, of course, also be installed in apparatus which operate with a different operating cycle and, for example, a different manner of purging than the apparatus as described herein.

The features and advantages of the present invention will become more clearly apparent from the following detailed description thereof which is to be read with reference to the accompanying drawings, in which—

FIGURE 3 shows an axial section of the adsorption chamber according to FIGURE 2;

FIGURE 4 shows a cross section which is taken along the line IV—IV of FIGURE 3; while FIGURE 5 shows an enlarged detail view of a part of the adsorption chamber according to FIGURE 1.

Figure 1:
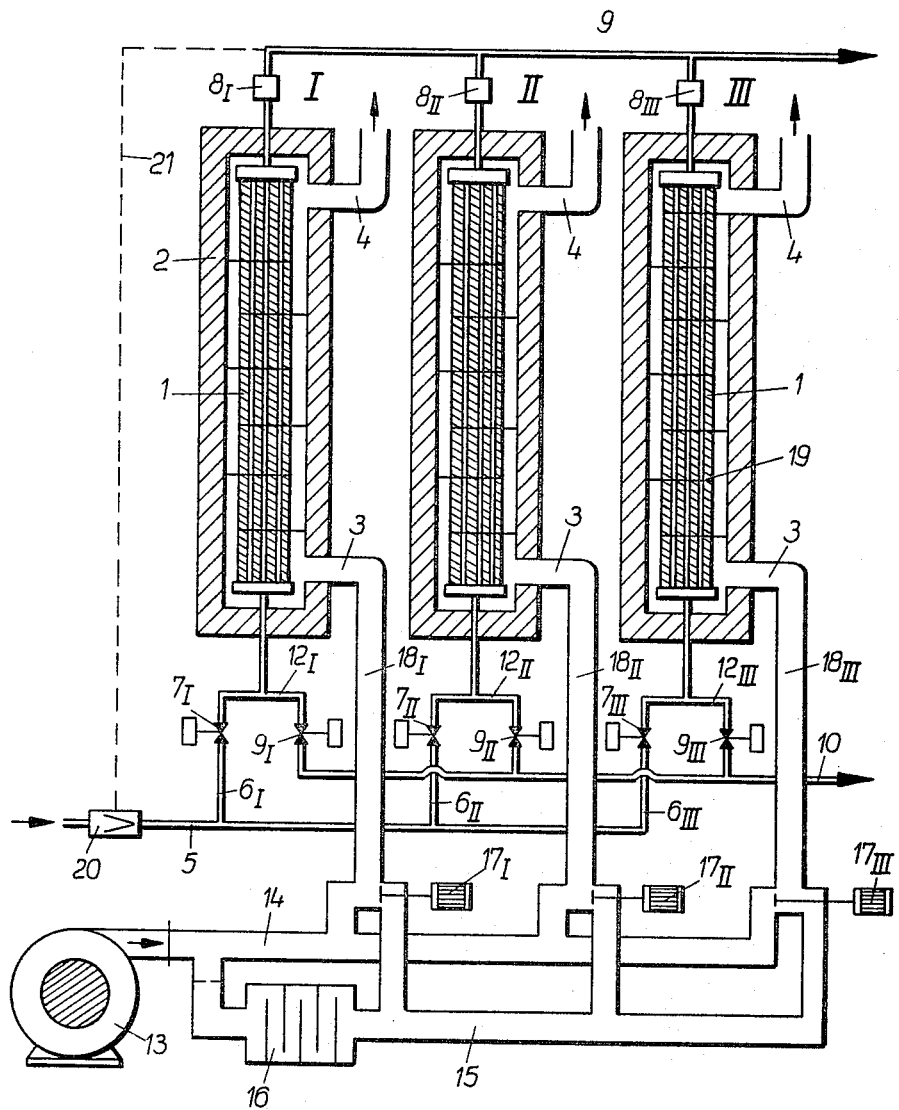
FIGURE 1 shows a diagrammatic illustration, partly in section, of the apparatus according to the invention.

Referring first particularly to FIGURE 1 of the drawings, each of the three adsorption chambers or beds I, II, and III comprises a plurality of containers 1 in the form of parallel pipes which are filled with the adsorbent and through which either the protective gas which is to be purified or the purge gas may be passed. These containers 1 are constructed substantially in accordance with conventional heat exchangers and those of each adsorption chamber are surrounded by a jacket 2 into which heating or cooling air may be supplied at 3 and be discharged at 4.

The particular design and construction of the adsorption chambers according to the invention insures a quick heat exchange between the heating medium which is supplied at 3 and the adsorbent which is contained in the pipes 1.

The adsorption chambers I, II, and III are connected in parallel by tap lines 6 to a supply line 5 for the untreated protective gas, and each of the tap lines is provided with a control valve 7. The purified protective gas passes from each adsorption chamber through a combined check and metering or throttle return valve 8 to a common delivery line 9 from which it is supplied to the place of consumption.

Each tap line 6 is further connected by a branch line 12, which may be closed by a control valve $9_I$, $9_{II}$ or $9_{III}$ to a common purge gas line 10 which leads to the outside.

The air current for the heating or cooling air is supplied by means of a blower 13 and is then distributed to two parallel branch lines 14 and 15, one of which contains a heater 16. The heating and cooling air from these lines 14 and 15 is passed by branch lines to switch valves 17 from which either the heating or cooling air is passed through a connecting line 18 to the inlet 3 of the respective adsorption chamber.

The mode of operation of the apparatus according to the invention is as follows:

It is first assumed that in the adsorption chamber I an adsorption process is being carried out. Valve $7_I$ is then open and valve $9_I$ is closed, and the protective gas flows from the supply line 5 through the tap line $6_I$ and valve $7_I$ and then through the pipes $i$ of this chamber I and the adsorbent therein. After being purified, the protective gas flows out of the adsorption chamber I through the return throttle or metering valve $8_I$ into the delivery line 9. In order to attain an isothermal adsorption, the adsorbent is cooled, for which purpose the switch valve $17_I$ is moved to the position as indicated in FIGURE 1, in which a current of cold air is passed from line 14 into the jacket 2.

During this time, the adsorption chamber III is in the desorption or regeneration period. As indicated in FIGURE 1, the switch valve $17_{III}$ is then in a position for the passage of a current of hot air from line 15 to the inlet 3 so that the adsorbent in pipes 3 of chamber III is heated so as to expel the substances which are adsorbed therein. Valve $7_{III}$ is then closed and valve $9_{III}$ is open. A limited amount of purified protective gas may therefore flow from the delivery line 9 through the throttle or metering return valve $8_{III}$ in the reverse direction through the adsorbent in pipes 1 of chamber III and thereby effect a purging action therein. This purge gas then passes through valve $9_{III}$ and the purge gas line 10 to the outside.

As indicated at 19, the adsorption chambers are provided with baffle plates which change several times the direction of flow of the air current through the respective adsorption chamber between the inlet 3 and the outlet 4. This insures that a temperature gradient will occur in the adsorbent between the inlet 3 and the outlet 4. The adsorbent will therefore be heated more intensively within the area near the gas inlet which is connected to the protective gas supply line 6 than it is heated in the higher areas of the respective adsorption chamber. When valve $17_{III}$ is switched over at the beginning of the desorption period, the area adjacent to the gas inlet is first heated before the other layers of the adsorbent which are located at a higher elevation are also heated. Therefore, the adsorbent within the area adjacent to the gas inlet which is charged with water is heated before the carbon dioxide which is contained in the higher layers of the adsorbent will be expelled. Consequently, that part of the adsorption chamber or bed which contains the water vapor is already heated to a temperature at which the water vapor may be expelled when the carbon dioxide which is contained in the upper layers is being separated.

Since the liberated carbon dioxide acts as a purging agent for the water vapor, only a small quantity of the purified protective gas which is determined by the return throttle or metering value $8_{III}$ will suffice to attain a complete purging effect. The quantity of the purified protective gas which flows back from line 9 through valve $8_{III}$ may be controlled in a very simple manner by a pressure governor 20 which is inserted into the supply line 5 of the untreated protective gas and connected to the line 9 by a control line 21, as indicated in dotted lines. The pressure governor 20 sets up a constant pressure difference between lines 5 and 9 so that at a fixed cross-sectional area of return flow of the return throttle valve $8_{III}$ the amount of the purge gas is also determined which escapes through valve $9_{III}$ and line 10 to the outside.

The adsorbent in the adsorption chamber II is already regenerated. It is cooled to the operating temperature by a cold air current which is passed from line 14 through the switch valve $17_{II}$ and the air inlet 3 into and through chamber II. As soon as the adsorbent in the adsorption chamber I must again be regenerated, chamber II can take its place for the next purifying operation.

It is quite obvious even from the drawing that the apparatus according to the invention is of a very simple and relatively inexpensive type of construction. It is also evident from the above description that no untreated, impure or newly polluted gas can ever leave the apparatus through the pure gas line 9. Except for the throttle valves 8, there are no control valves required in the lines leading from line 9 to the pipes 1.

The switch valves 17 may be of a relatively simple construction since a small leakage of these valves is of no importance and can only cause a small amount of hot air to be mixed with the cold air or vice versa. Since the circuit of the protective gas is entirely separate from that of the hot or cold air circuit, there is no possibility that the protective gas might be polluted by air.

In order to preheat the purge gas which is withdrawn from the pure gas line 9 so as to improve the regeneration, it is advisable to connect the gas return line 21, as shown in FIGURE 1, to the adsorption chamber at the end thereof adjacent to the hot air inlet 3 and to pass it through the entire length of the adsorption bed before being connected to the upper ends of pipes 1. Such a construction also permits the adsorption chambers to be built according to the principle of unit construction and to adapt them to different operating conditions by simply mounting several units above each other and connecting them to each other.

The particular arrangement of the hot and cold air connections on the jackets 2 of the adsorption chambers results during the adsorption period in an unidirectional flow of protective gas within the pipes 1 and of cold air passing along the outside of these pipes. This has the advantage that a more intensive cooling action upon the adsorbent will be attained in the area adjacent to the inlet of the protective gas.

Finally, it should be pointed out that the new method as well as the apparatus according to the invention may be employed not only for purifying protective gas, but also for purifying other gases.

*Example*

Propane ($C_3H_8$) is mixed with air in a combustion chamber. The combustion products are cooled, passed at a temperature of about 400° C. over a catalyst which accelerates the water gas reaction, and are thereafter cooled to room temperature. This results, for example, in a raw gas of the following composition:

|  | Percent |
|---|---|
| Hydrogen ($H_2$) | 4.3 |
| Carbon monoxide (CO) | 0.9 |
| Carbon dioxide ($CO_2$) | 13.5 |
| Water vapor ($H_2O$) at a dew point of +20° C. | 2.2 |
| Nitrogen | 79.1 |

This crude gas is conducted through the adsorption apparatus in which all carbon dioxide and water vapor except traces thereof are removed. The purified gas has the following composition:

|  | Percent |
|---|---|
| Hydrogen ($H_2$) | 5.0 |
| Carbon monoxide (CO) | 1.0 |
| Carbon dioxide ($CO_2$) | <0.01 |
| Water vapor ($H_2O$) at a dew point of less than −60° C. | <0.01 |
| Nitrogen | 94.0 |

While the adsorbent is being heated for being regenerated, for which purpose preferably the heat is also employed which is liberated between the combustion chamber and the converter in which the water gas reaction is carried out, 5 to 10% of the pure gas are conducted through the respective container to serve as a purge gas. Therefore, the contents of carbon dioxide and water vapor also do not increase when the operation of the apparatus is being switched from one adsorption chamber to the other.

The details of construction of the adsorption chambers as previously described are more clearly illustrated in FIGURES 3 to 5.

Figure 2:
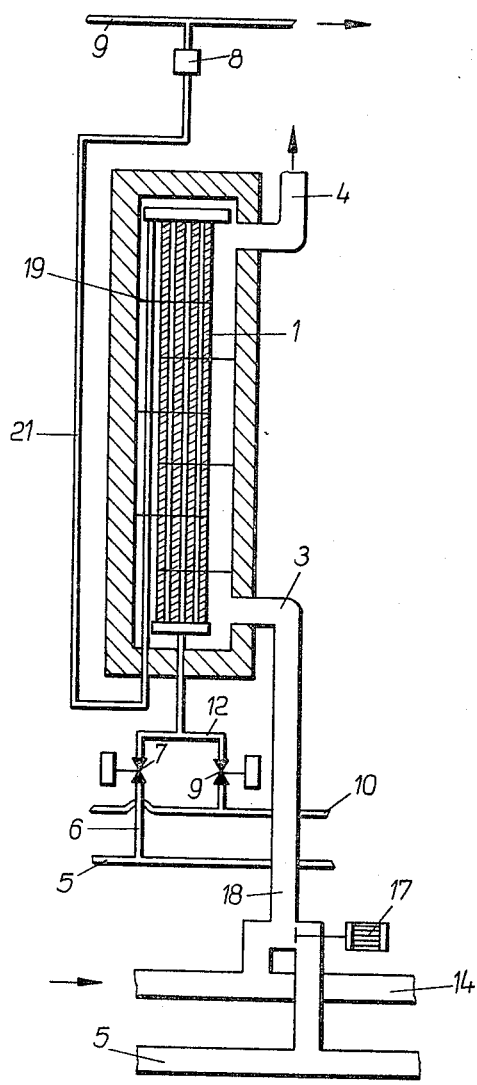
FIGURE 2 shows a similar illustration of a modification of one of the adsorption chambers of the apparatus according to FIGURE 1.

The pipelike containers 1 of each adsorption chamber terminate at their upper ends into a chamber 50 and at their lower ends into a chamber 60. Into the upper chamber 50 a screen 51 may be installed, as indicated in FIGURE 3 in dotted lines. The diameter of pipes 1 is less than 60 mm. and a diameter of 30 mm. has been found to be especially suitable. The pipes 1 are filled with adsorbent, especially zeolites. The lower chamber 60 is connected to the line 12, as shown in FIGURE 2, by a tap line 70 which serves for supplying the gas to be purified to the pipes 1. After passing through the adsorbent in these pipes 1, the gas which is thereby purified collects in chamber 50 from which one or several parallel delivery lines 80 branch off which may be connected at 81 to the line 21, as shown in FIGURE 2. The container pipes 1 which are combined to form a unit are surrounded by a jacket 2 which consists of an inner jacket 2a and an outer jacket 2b which are separated by an insulating material 2c. Jacket 2 is closed at its lower end by an insulated bottom 30 and at its upper end by a removable insulated cover 31. It is further provided with connecting sockets 32 and 33 for supplying the heating or cooling medium to the inside of the jacket 2 and for discharging it therefrom. The connecting socket 32 is connected to the channel 3 and the connecting socket 33 to the channel 4, as shown in FIGURE 2.

In place of the unit consisting of the container pipes 1 as shown in FIGURE 3, it is also possible to install several such units in the jacket 2. The height of these units may also be easily varied in accordance with the particular operating requirements.

The upper chamber 50 is hermetically closed by a cover 50' which may be removably locked thereto, for example, as illustrated in FIGURE 5, by being welded at 50" to the upper edge of the wall of chamber 50. If repairs have to be made, it is an easy matter again to sever this connection and subsequently to close the same tightly by a new weld 50'. Between the insulated cover 31 of jacket 2 and the upper chamber 50 of the pipe unit, there is sufficient space to allow for the heat expansion of the pipes 1.

As illustrated in FIGURE 4, one or more partitions 34 may be installed between the pipes 1 to separate them into several groups, and baffle plates 19 may also be installed for varying the direction of flow of the hot or cold air current for attaining the desired temperature distribution.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a process in which a gas is purified in a column having a bed of adsorptive material having first and second ends, the gas containing substances adsorbable by said adsorptive material, said material having a varying affinity for said substances and the gas being introduced into the column at the first end of the bed and removed at the second end, so that the substance of greater affinity is adsorbed near the first end of the bed and the substance of lesser affinity at a more remote point in the bed, the regeneration of said bed comprising progressively heating the adsorptive material from the first end to the second end and passing an unheated purge gas through the adsorptive material from the second end to the first end, so that the portion of the bed containing the substance of greater affinity is heated to a sufficient temperature to expel a portion of the substance of greater affinity before the portion of the bed containing the substance of lesser affinity is heated to a sufficient degree to cause substantial removal of the substance of lesser affinity and then the portion of the bed containing the substance of lesser affinity is heated to a temperature sufficient to cause substantially all of the substance of lesser affinity to be removed with the purge gas, joining said substance of lesser affinity to the purge gas to assist the purge gas, as the latter passes through the portion of the bed containing the remainder of the substance of greater affinity, to remove such substance of greater affinity from the bed.

2. A method as claimed in claim 1 in which the column is vertical and the first end of the bed is below the second end.

References Cited
UNITED STATES PATENTS

| | | | |
|---|---|---|---|
| 1,949,779 | 2/1934 | Abbott et al. | 55—62 X |
| 2,080,578 | 5/1937 | Ray | 55—179 |
| 2,083,732 | 6/1937 | Moore et al. | 55—33 X |
| 2,413,771 | 1/1947 | Luaces | 55—179 |
| 2,992,703 | 7/1961 | Vasan et al. | 55—62 |
| 3,103,425 | 9/1963 | Meyer | 55—62 |
| 3,164,452 | 1/1965 | Westeren et al. | 55—33 |
| 3,221,476 | 12/1965 | Meyer | 55—68 X |

REUBEN FRIEDMAN, *Primary Examiner.*

J. ADEE, *Assistant Examiner.*